2 Sheets—Sheet 1.
L. T. WILCOX.
OIL STOVE.
No. 11,484. Reissued Apr. 9, 1895.
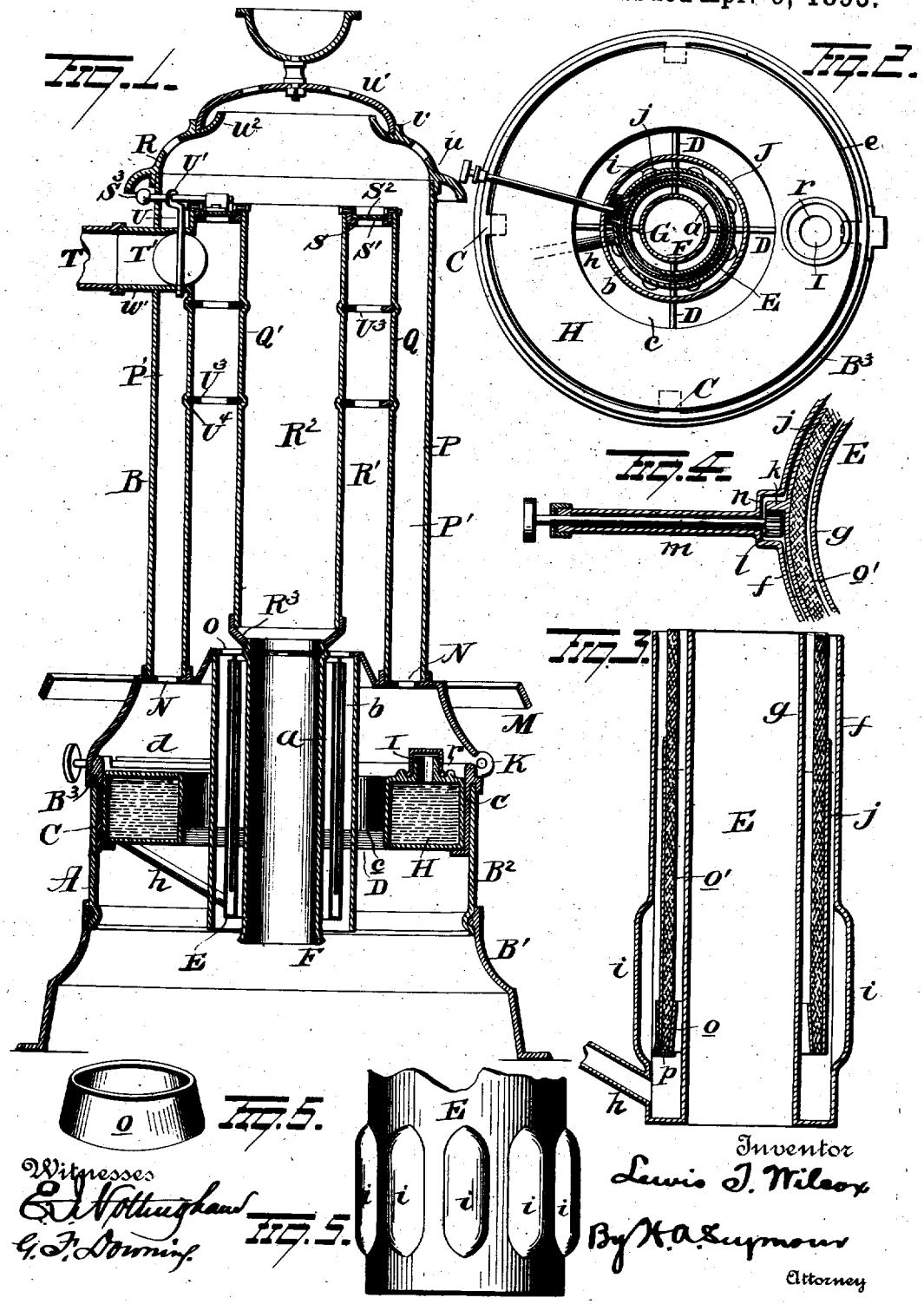
Witnesses
E. Nottingham
G. F. Dominy
Inventor
Lewis T. Wilcox
By H. A. Seymour
Attorney 2 Sheets—Sheet 2.

L. T. WILCOX.

OIL STOVE.

No. 11,484.

Reissued Apr. 9, 1895.

Witnesses
E. A. Nottingham
G. F. Domingo

Inventor
Lewis T. Wilcox
By H. A. Seymour
Attorney

UNITED STATES PATENT OFFICE.

LEWIS T. WILCOX, OF SOUTH BEND, INDIANA.

OIL-STOVE.

SPECIFICATION forming part of Reissued Letters Patent No. 11,484, dated April 9, 1895.

Original No. 449,343, dated March 31, 1891. Application for reissue filed February 24, 1893. Serial No. 463,647.

*To all whom it may concern:*

Be it known that I, LEWIS T. WILCOX, of South Bend, in the county of St. Joseph and State of Indiana, have invented certain new and useful Improvements in Oil-Stoves; and I do hereby declare the following to be a full, clear, and exact description of the invention, such as will enable others skilled in the art to which it pertains to make and use the same.

This invention relates to new and useful improvements in oil-stoves; and the invention consists in the peculiar construction and arrangement of the various parts whereby a more convenient and efficient stove is produced, all as more fully hereinafter described.

Figure 7:
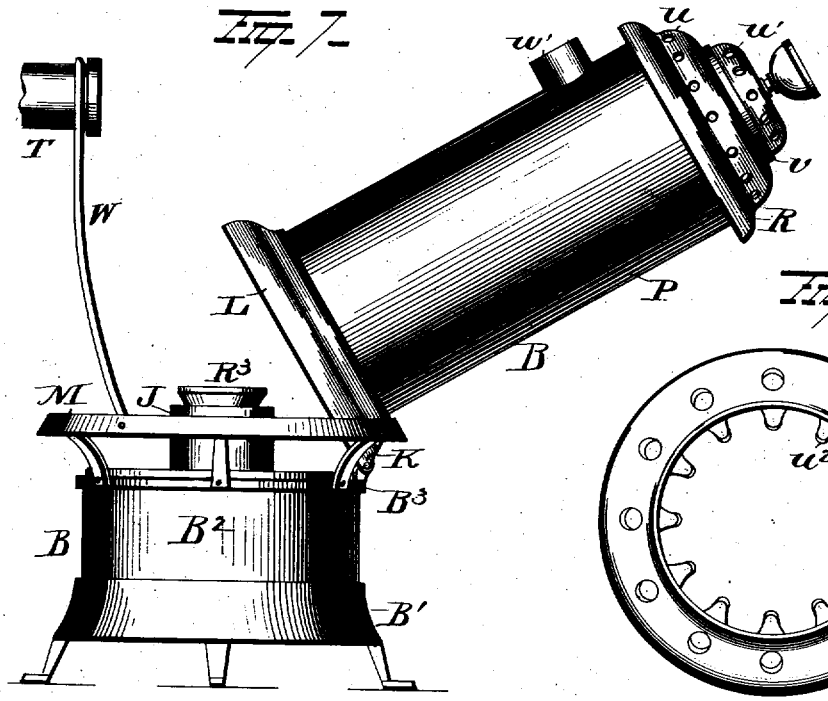
Figure 8:
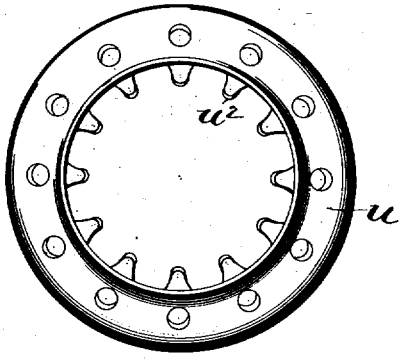
Figure 9:
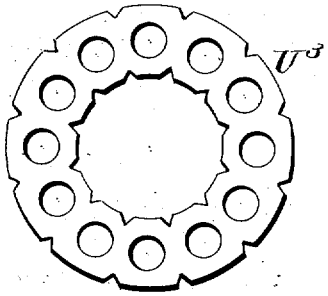
Figure 10:
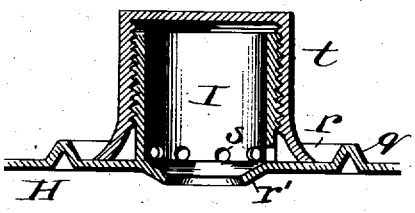

In the accompanying drawings, Figure 1 is a vertical central longitudinal section of my improved stove. Fig. 2 is a plan view partly in section of the base and attachments with the top removed. Fig. 3 is an enlarged vertical central section through the wick-tube. Fig. 4 is a detail cross section through the wick-tube showing raising and lowering device. Fig. 5 is an enlarged side elevation of the lower part of the wick tube. Fig. 6 is a detached perspective view of the wick-clamping ring. Fig. 7 is a side elevation of the stove showing the top tipped back. Fig. 8 is a plan view of the top with the cover removed. Fig. 9 is a plan view of one of the perforated partitions, and Fig. 10 is an enlarged section through the oil supply nozzle.

A is the annular base supported on suitable legs and to which is hinged the top B. The base consists of the outer annular casting B′ upon which is secured the body or casing $B^2$ of sheet-metal. Upon the top of casing $B^2$ is secured by means of suitable rivets a ring $B^3$, preferably of cast-iron and from which depends a series of brackets C upon which is supported the oil-tank H, a series of braces D which are connected to the oil tank H and at their inner ends to the wick-tube E.

F is a central air-tube supported by the extensions G of the braces H, said extensions connecting the inner side of the wick tube and outer side of the central air tube F.

Oil tank H is rectangular in cross-section and circular in shape in plan, and is provided with a filling opening I.

Outside of wick-tube E is arranged the annular partition J. This partition with the wick-tube E and the central air tube F force between them the air supply passages *a b*. An annular space or passage *c* is formed between the annular partition J, and the inner wall of the annular oil-tank H, which communicates at its upper end with the air-chambers *d* above the oil-tank. An air-space *e* is formed around the outside of the oil tank so that there is an air space all around the oil-tank to prevent it from becoming heated. Wick tube E is formed by the inner tube *g* and outer tube *f*, and is connected to the oil tank by one or more inclined connecting pipes *h*. Upon the outside this tube is provided with a series of enlargements *i* which form an auxiliary oil well or supply.

*j* is a sleeve, which on its outer edge is provided with a rack-bar *k*, with which the pinion *l* of the wick-raising shaft *m* engages, a suitable offset *n* being formed in the outer side of the wick-tube E for the passage of this rack-bar.

To place a wick in the wick-tube it is first inserted within the sleeve *j*, with the bottom of the wick flush with the bottom of the sleeve, and then the inclined annular clamping-ring *o* is inserted in the bottom of the sleeve, clamping the wick *o′* firmly between it and the sleeve, as plainly shown in Fig. 3. The parts are held in this position by means of the spring *p*, which engages under the lower edge of the wick the clamping-ring. The sleeve thus fitted with the wick is now inserted into the wick-tube and lowered to the desired point by means of the rack-bar and gear-wheel in the ordinary manner.

It will be observed that I have placed the oil-supply aperture I immediately in front of the hinge K, so that when the top is tipped upon its hinge it will interpose the fire between the operator and the oil-supply aperture I, which would prevent his filling the tank without putting out the fire, the approach to the oil-supply aperture from the other side being prevented by the upturned end of the top.

Around the oil-supply aperture I form an annular rim *q*, forming between it and the screw-threaded nozzle of the aperture the annular well *r*. The screw threaded nozzle I provide at its base with apertures *s*, which the cap *t* when screwed to its lowest position will close, but which when the cap is partially screwed down will allow the oil in the well $r$ to enter the apertures, and thus pass into the tank. Within the nozzle I form the lips of the opening into a downwardly-projecting flange $r'$ whereby the operator in filling may see the level of the oil before it reaches the top. The top B consists of the main casting L, which at K is hinged to its base. To this base is secured a suitable fender M. The casting L is provided with a series of apertures N, which communicate when the top is down with the air-chamber $d$, and is also provided with an annular opening O, which forms the aperture through which the flames pass from the top of the wick tube. Upon the main casting L are supported the walls P and Q, the former forming the outer cylinder-casing and secured at its bottom to the lower casting L, and at its upper end supporting a suitable ornamental perforated top R. The wall Q is similarly secured upon the casting L at its lower edge, and at its upper edge it connects to a top plate S. This top plate is centrally apertured, and within this aperture is secured the depending central tube Q'. Between the walls P and Q is formed an annular air-chamber P', and between the walls Q and Q' is formed an annular combustion chamber R'. Within the tube Q' is formed the chamber $R^2$, which connects at the lower end into the contracted deflecting plate $R^3$, secured at its lower end upon the air-tube F. The top plate S is in the shape of an annular casting fitting over the chamber R' and provided with a series of apertures S', which are adapted to be opened and closed by means of a sliding damper $S^2$, correspondingly apertured, whereby the products of combustion may be allowed to pass out through this damper into the chamber below the top, and from thence through the perforations into the room; or by closing the damper it may be made to pass out through the stove-pipe T. The damper T' of the stove is pivoted upon the shaft U, which has a crank U' engaging with the handle $S^3$ of the damper $S^2$, all so arranged that upon opening the damper $S^2$ to allow the products of combustion into the room the damper T' is closed, and upon closing the damper $S^2$ the damper T' is opened. The top R, I construct in two parts $u$ $u'$, the part $u$ being supported upon the casing P and provided with the inwardly projecting arms $u^2$ and with the annular flange $v$. The top of cover $u$ rests upon the arms $u^2$ and bears against the flange $v$, forming a tight joint and giving the appearance of a single completed top.

By providing outer air passage in close proximity to the combustion chamber, and communicating with the chamber $d$ above the oil fount, the air in the passage is heated, and creates an increased draft around the oil tank and up through the air passage. It makes very little difference how open the castings may be around the fount, for if there is not an air pass above to create a draft the radiant heat from the casting above the fount will heat the fount sufficiently to cause an odor.

The parts being thus constructed and arranged, they are intended to operate as follows: The tank being filled with oil and the wick suitably raised, the top being turned in position, as shown in Fig. 1, after the fire is lighted the flames will impinge upon the inclined sides of the contracted ring $R^3$, thereby rapidly heating the air within the chamber $R^2$ and creating a quick circulation through it and its complementary tube F. It will be seen that the air-supply for the flame is given through the passages $a$ and $b$. The air in the chamber P' being heated by the hot air in the combustion-chamber rapidly rises and enters the top and then passes out into the room, a new supply of air being furnished through the aperture N from the chamber $d$, which is supplied beneath the stove through the annular passages $c$ and $e$, the continual passage of air around the oil-tank keeping it cool. When the oil is exhausted in the oil-tank, the flame will burn low; but owing to the auxiliary supply of oil in the projections $i$ around the wick-tube it will not burn the wick for a long while after giving warning of the condition of the oil-tank, as would be the case if these were absent. This has been a constant source of trouble in oil-stoves, that without giving any warning when the oil was nearly exhausted the fire would go down and char the wick, thereby rapidly destroying it. By this auxiliary oil-supply I form an efficient means of preventing this trouble with any ordinary care in running the stove. It will be seen also that my combustion chamber forms a middle passage-way, the walls thereof having contact on the inside with the inner air-chamber and on the outside with the outer air-chamber. This construction gives me the most efficient results from the heat in the products of combustion being given out rapidly into the air chamber upon both sides.

In order to retard somewhat the forward flow of the draft in the combustion-chamber and thereby get better results from the heat from the products of combustion, I arrange one or more annular perforated partitions $U^3$ within the combustion-chamber, which I hold therein by suitable grooves or projections in the walls of the tube Q' upon one side and the wall Q upon the other side, as shown at $U^4$, which forms a suitable support and below the perforated partitions. I also cut out the edges of this partition and bend them slightly up or down to get the spring action of the metal and hold it in place, as plainly shown in Fig. 9.

The end of the stove-pipe T, I support by means of the bracket W, which is secured at its lower end to the foot-rail M, and at its upper end is provided with a suitable collar to embrace the stove-pipe, all so arranged that when the stove is turned down the stove-pipe remains firmly supported independent of the nipple $w'$ upon the stove itself.

What I claim as my invention is—

1. In an oil-stove, the combination, with the oil-tank, of a screw-threaded supply-nozzle, an aperture at the base thereof, a flange $q$ around said nozzle forming a well I, and a cap $t$, substantially as described.

2. In an oil-stove, the combination, with an oil-tank and its supply-nozzle, of the downwardly-projecting inclined flange $r'$ within the nozzle, substantially as and for the purpose described.

3. In an oil-stove, a wick-tube having an inside and an outside vertical wall, the outer wall having enlargements or chambers formed on its lower end, substantially as described.

4. In an oil-stove, a wick-tube having a series of enlargements $i$ therein formed around the base thereof, arranged below the bottom of the oil-tank, substantially as described.

5. In an oil-stove, the combination, with the wick-tube, of the sleeve $j$, having the spring $p$ and the clamping-ring $o$, substantially as described.

6. In an oil-stove, the combination, with the wick-tube having the offset $n$, the sleeve $j$, having rack-bar $k$ adapted to move in said offset, the clamping-ring $o$, wick $o'$, and spring $p$, substantially as described.

7. In a stove of the kind described, the combination, with the base and burner, of the top having an annular combustion-chamber, a central air flue within said combustion-chamber, and an annular flue outside of and surrounding the combustion-chamber, both flues in contact with the walls of the combustion-chamber, substantially as described.

8. In a stove of the kind described, the combination, with the base, of a central wick-tube in the base, a central air-flue within said wick-tube, a top having an annular combustion-chamber, a central air-flue forming a continuation of the central air-flue, and an outer air-flue, both in contact with the walls of the combustion-chamber, substantially as described.

9. In an oil-stove, the combination, with the base having an annular wick-tube, and an air-flue F, formed within and the chamber $d$ outside the wick-tube, of the top having an annular combustion-chamber above the wick-tube, a central air-flue communicating with the air-flue F, and an annular air-flue surrounding the combustion-chamber and communicating with the chamber $d$, substantially as described.

10. In an oil-stove, the combination, with the annular combustion-chamber, of the perforated top therefor, the correspondingly-perforated damper $S^2$, and handle $S^3$, the exit-pipe T, communicating with said combustion-chamber, and a damper T', having the shaft U and the crank U' connected with and operated by the handle $S^3$ of the damper $S^2$, substantially as and for the purpose described.

11. In a stove of the kind described, the combination, with the base and the hinged top, of the perforated top casting $u$, having the inwardly-projecting arms $u^2$ and the annular flange $v$ of the perforated cover $u'$, the parts constructed substantially as and for the purpose described.

12. In a stove of the kind described, the combination of the following elements; a base-casting B', the casing $B^2$, the annular top rim $B^3$, the top hinged to said rim, the downwardly projecting brackets C, and the oil-tank supported thereon, substantially as set forth.

13. In an oil stove the combination with an oil tank constructed with an air passage extending through it, of an air chamber located above the oil tank and shut off from the combustion chamber and a flue communicating with said air chamber and serving to conduct air to the upper portion of the stove, and a separate combustion chamber for carrying off the products of combustion and arranged to heat the air flowing upwardly in the air-flue, whereby an upward flow of air is maintained through and over the oil tank and is then heated and discharged into the room to be heated, without having become contaminated by the products of combustion, substantially as set forth.

14. In an oil stove the combination with an oil tank constructed with an air flue extending through the tank and an annular air flue for conducting air upwardly in contact with its outer wall, of an air chamber located above the tank, an air flue communicating with the air chamber above the tank and serving to conduct air to the upper portion of the stove and a separate combustion chamber for carrying off the products of combustion and arranged to heat the air flowing upwardly in the air flue, whereby the air is caused to flow upwardly through and around the tank and over it and is then heated and discharged without having become contaminated by admixture therewith of the products of combustion, substantially as set forth.

15. In an oil stove the combination with an oil tank of an air chamber located over the tank, and in communication with the outer air a flue communicating with said air chamber and serving to conduct the air from the chamber to the upper portion of the stove, and a separate flue for carrying off the products of combustion shut off from the air chamber and the air flue and arranged to heat the air flowing upwardly in the air-flue, substantially as set forth.

In testimony whereof I sign this specification, in the presence of two witnesses, this 31st day of January, 1893.

LEWIS T. WILCOX. [L. S.]

Witnesses:
JOHN LOWRY,
E. HAMLIN HOVEY.